United States Patent
Miyazaki et al.

(10) Patent No.: US 7,991,354 B2
(45) Date of Patent: Aug. 2, 2011

(54) METHOD OF COMMUNICATION AND BASE STATION

(75) Inventors: Masayuki Miyazaki, Tokyo (JP);
Minoru Oogushi, Kokubunji (JP);
Kazuo Yano, Hino (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 12/926,449

(22) Filed: Nov. 18, 2010

(65) Prior Publication Data
US 2011/0070909 A1 Mar. 24, 2011

Related U.S. Application Data

(63) Continuation of application No. 10/929,793, filed on Aug. 31, 2004, now Pat. No. 7,873,380.

(30) Foreign Application Priority Data
Jul. 21, 2004 (JP) ................................. 2004-212672

(51) Int. Cl.
*H04B 7/00* (2006.01)
*H04B 1/00* (2006.01)
*H04B 1/38* (2006.01)
*H04B 1/04* (2006.01)
*H04Q 11/00* (2006.01)
*H04W 4/00* (2009.01)
*H04L 12/60* (2006.01)
*H04L 12/56* (2006.01)

(52) U.S. Cl. ............ 455/39; 455/522; 455/69; 455/561; 455/127.5; 455/574; 370/328; 370/382; 370/392

(58) Field of Classification Search .................. 455/522, 455/69, 561, 127.5, 574; 370/328, 382, 392
See application file for complete search history.

(56) References Cited

U.S. PATENT DOCUMENTS
5,715,278 A * 2/1998 Croft et al. .................... 375/224
(Continued)

FOREIGN PATENT DOCUMENTS
CN 1110886 A 10/1995
(Continued)

OTHER PUBLICATIONS
China Patent Office second Office Action dated Apr. 6, 2007, English Translation.
(Continued)

*Primary Examiner* — Lewis G West
*Assistant Examiner* — Bobbak Safaipour
(74) *Attorney, Agent, or Firm* — Stites & Harbison PLLC; Juan Carlos A. Marquez, Esq.

(57) ABSTRACT

There are provided a method of communication which can reliably transmit information from a base station to a wireless terminal in a system which can reduce power consumption by intermittent operation in which the wireless terminal repeats operating state and suspended state by power on and off and the base station used for the method. The method includes the steps of storing base station information such as a command or data supplied to the wireless terminal in the base station, transferring the wireless terminal from the suspended state to the operating state to transmit information from the sensor to the base station, coupling the base station information stored in the base station to a response signal to transmit it to the wireless terminal in the operating state for transmitting the sensor information, and returning the wireless terminal to the suspended state after completing the transmission of the base station information and sensor information.

12 Claims, 18 Drawing Sheets

U.S. PATENT DOCUMENTS

| | | |
|---|---|---|
| 7,239,896 B1 | 7/2007 | Hill et al. |
| 7,688,778 B2 * | 3/2010 | Ogushi ........................ 370/328 |
| 2002/0148477 A1 * | 10/2002 | Kwoen ........................ 128/920 |
| 2003/0236100 A1 * | 12/2003 | Fujieda et al. ............. 455/550.1 |
| 2004/0266480 A1 * | 12/2004 | Hjelt et al. .................... 455/558 |
| 2005/0136994 A1 * | 6/2005 | Bahl et al. .................... 455/574 |
| 2006/0019724 A1 * | 1/2006 | Bahl et al. .................... 455/574 |
| 2007/0004470 A1 * | 1/2007 | Goris et al. .................. 455/574 |

FOREIGN PATENT DOCUMENTS

| | | |
|---|---|---|
| CN | 1381219 A | 11/2002 |
| JP | 10-014890 | 1/1998 |
| JP | 11-073481 | 3/1999 |
| JP | 11-287818 | 10/1999 |
| JP | 2000-224105 | 8/2000 |
| JP | 2001-237985 | 8/2001 |
| JP | 2004-053355 | 2/2004 |
| JP | 2004-165791 | 6/2004 |
| WO | WO 94/27377 | 11/1994 |
| WO | WO 97/49077 | 12/1997 |

OTHER PUBLICATIONS

"Notification of Reasons for Refusal" from the Japanese Patent Office, dated Jun. 9, 2009, in English translation.

* cited by examiner

METHOD OF COMMUNICATION AND BASE STATION

CROSS-REFERENCE TO RELATED APPLICATION

This application is a Continuation of U.S. patent application Ser. No. 10/929,793 filed Aug. 31, 2004 now U.S. Pat. No. 7,873,380. The present application claims priority from U.S. patent application Ser. No. 10/929,793 filed Aug. 31, 2004, which claims priority from Japanese Application No. 2004-212672 filed on Jul. 21, 2004, the contents of which are hereby incorporated by reference into this application.

FIELD OF THE INVENTION

The present invention relates to a method of communication performed between a wireless terminal (node) and a base station. More specifically, the present invention relates to a method of communication for providing information such as a command from a base station to a wireless terminal.

BACKGROUND OF THE INVENTION

In recent years, there has been realized a system which has a semiconductor integrated circuit arranged at every location in life and can use an information terminal at any time in any place, that is, a ubiquitous system.

A cellular phone and a wireless LAN (local area network) terminal are an example of the information terminal used in such system. These are of portable type and incorporate a battery. Due to requirement for reducing consumption of the battery, power consumption of the devices is reduced. For instance, a cellular phone which can change transmitted electric power according to communication distance to reduce power consumption is disclosed in Japanese Patent Laid-open No. 2000-224105.

A wireless tag and a contactless IC card on which an IC chip and an antenna are mounted are another example of the information terminal and have been handily used recently. The wireless tag and IC card have specific data and supply the data to a reader and writer. With no power source, they receive an electromagnetic wave emitted from the reader and writer and use as a power source an electric power obtained by rectifying the wave. The obtained electric power is weak, and power consumption of the circuit should be reduced. To make it possible to use a memory operated with low power consumption at low voltage, an example of a contactless IC card which divides a rectified electric power into two for use is disclosed in Japanese Patent Laid-open No. Hei 11 (1999)-73481.

An example of a wireless terminal of a non-portable type which starts to operate only when needed for reducing power consumption to intermittently transmit sensor information is disclosed in Japanese Patent Laid-open No. Hei 11 (1999)-287818.

SUMMARY OF THE INVENTION

The information terminals are all devices which can transmit information. To receive information from a base station, the cellular phone and wireless LAN are in receiving operating state by constantly supplying power to a receiving unit except at transmission, thereby limiting reduced power consumption. The wireless tag and the contactless IC card cannot transmit information for itself without an electromagnetic wave emitted from the reader and writer. The wireless terminal which performs intermittent transmission is turned on only at transmission and cannot perform normal receiving.

If a method of communication in which an information terminal can intermittently transmit information for itself when necessary and receive a command or data from a base station can be realized, sophisticated information utilization can be made. As a model of such information utilization, for instance, there is a wireless sensor network (hereinafter, abbreviated as a sensor net) in which an information terminal equipped with a sensor has a wireless function to form a network by radio, efficiently transmitting sensor information.

For an information terminal with sensing function for realizing the sensor net, it is effective that the device is made smaller and has reduced power consumption using a semiconductor integrated circuit. In the case that the sensor and the wireless function can be operated by low power consumption, the wireless terminal can incorporate a power source (or a battery). Installation of the device can be simplified without installing wiring.

The capacity of the incorporated power source is limited. Thorough power consumption reduction of the wireless terminal with sensing function is desired. Basically, essential is intermittent operation which operates the wireless terminal when necessary and suspends the operation by power off when not necessary. An example of a method of communication which transmits information from a wireless terminal with sensing function to a base station by such intermittent operation can be shown in FIG. 20. The method of communication is executed in a communication system in which a wireless terminal with sensing function (NOD) 10 is connected to a base station (BAS) 20 by radio and the base station is connected via a network to a server (SRV) 40.

The wireless terminal 10 includes a small power source such as a battery. To reduce the number of times of battery replacement to be the fewest, power to an area performing measurement and communication is shut off when not measuring data using the sensor and not transmitting data to the base station. This can reduce power consumption. The wireless terminal 10 cannot perform wireless communication with the base station 20 in suspended period in which power to the area is shut off.

Power on is performed by occurrence of a certain event such as time. In the case that an event is time, the wireless terminal 10 incorporating a clock turns on the area when a predetermined time has come. Power is constantly on to the clock. In the case that power is shut off and the area is in stop state, the wireless terminal 10 is not stopped and is brought to suspended state, that is, to sleep state.

In FIG. 20, the wireless terminal 10 is powered off in suspended period to be transformed into sleep state (s110). After that, in the case that a certain event (s140) such as time occurs, power is supplied and the wireless terminal 10 starts to operate (s150).

The wireless terminal 10 forms a communication frame for transmitting necessary information by radio through an operation such as data measurement using a sensor 144 or data calculation using an operation unit (s160). The wireless terminal 10 uses the formed communication frame to transmit information data to the base station 20 (s161).

The base station 20 checks whether there is a receiving error in the received communication information (s170) to form a communication frame for performing communication with the wireless terminal 10 and the server 40 (s180).

The base station 20 transmits to the server 40 the data received from the wireless terminal 10 to perform request of renewal of information of a database 41 (s182), thereby performing renewal of information of the database in the server

40 (s210). At this time, communication between the base station 20 and the server 40 is based on TCP/IP. There is incorporated a mechanism in which the request of renewal of database s182 is communicated by the TCP/IP to transmit the data from the base station 20 to the server 40, and subsequently, a response (Acknowledge, hereinafter, abbreviated as ACK) signal as a response indicating that the data is correctly received is sent back from the server 40 to the base station 20. When the base station 20 receives the ACK signal from the server 40, it transmits to the wireless terminal 10 the ACK signal as a response indicating that the information is correctly received (s1811).

When the wireless terminal 10 receives the ACK signal (s1811) from the base station 20, it performs error check (s190) whether the ACK signal is correct or not. When the wireless terminal 10 reliably receives the ACK signal, it is transformed into sleep state (s220) by power off again.

In the communication sequence of the wireless terminal 10, the wireless terminal 10 is suspended by power off during the period from steps s110 to s140. It is operated by supply of power during the period from steps s140 to s220. From steps s140 to s160, sensing and measurement and an arithmetic operation of the operation unit are performed. In step s161, the wireless terminal 10 is in transmission state. In steps s170 to s190, it is in receiving state for receiving the ACK signal s1811.

Information such as measured data is transmitted to the base station by intermittent operation. Receive of a command and data from the base station in the wireless terminal, which permits sophisticated information utilization, cannot be realized.

An object of the present invention is to provide a method of communication which can reliably transmit information from a base station to a wireless terminal in a system which can reduce power consumption by intermittent operation in which the wireless terminal repeats operating state and suspended state by power on and off and a base station used for the method.

A method of communication according to the present invention for achieving the above object which is performed between a wireless terminal having a sensor making measurement and performing intermittent operation which repeats operating state and suspended state and a base station, includes the steps of storing first information supplied to the wireless terminal in the base station, transmitting second information from the sensor to the base station after transferring the wireless terminal from the suspended state to the operating state, transmitting the first information stored in the base station to the wireless terminal in the operating state for transmitting the second information, and returning the wireless terminal to the suspended state after completing the transmission of the first and second information.

The first information is a command or data supplied to the wireless terminal. The first information is stored in the base station until the wireless terminal is brought to operating state for performing transmission. When the wireless terminal is in operating state, the first information is transmitted from the base station to the wireless terminal. The first information can be reliably transmitted to the wireless terminal.

These and other objects and many of the attendant advantages of the invention will be readily appreciated, as the same becomes better understood by reference to the following detailed description when considered in connection with the accompanying drawings.

DETAILED DESCRIPTION OF THE PREFERRED EMBODIMENTS

Figure 1:
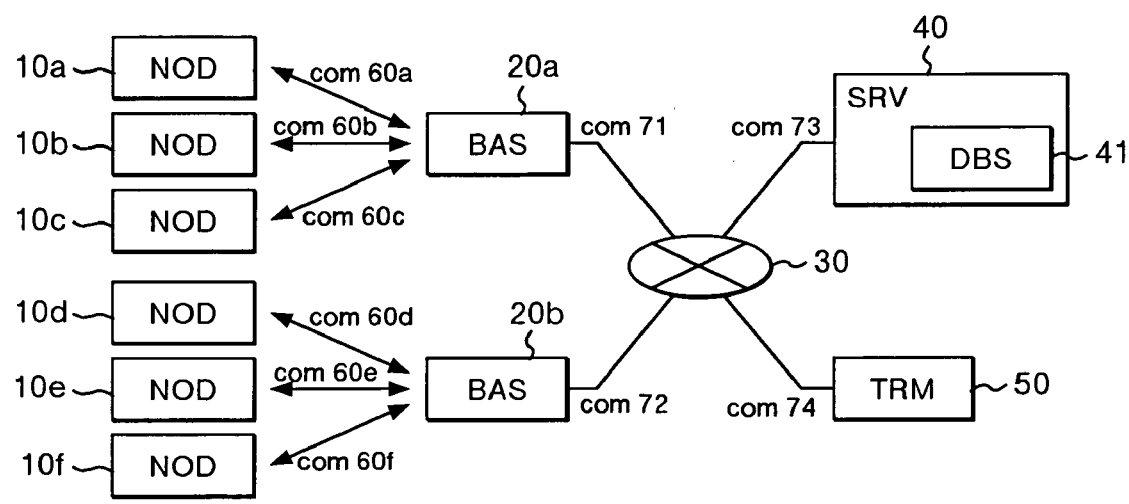
FIG. 1 is a block diagram of a communication system of assistance in explaining Embodiment 1 of a method of communication according to the present invention.

A method of communication and a base station according to the present invention will be described below in greater detail with reference to some embodiments shown in the drawings.

Embodiment 1

FIG. 1 shows an example of a communication system for executing a method of communication according to Embodiment 1. The communication system comprises a plurality of wireless terminals (NOD) with sensing function 10a to 10f, a plurality of base stations (BAS) 20a and 20b, the internet (INT) 30, a server (SRV) 40, and an indicator terminal (TRM) 50.

The server 40 includes a database (DBS) 41. The wireless terminals 10a to 10c perform wireless communication with the base station 20a by signals (com) 60a to 60c. The wireless terminals 10d to 10f perform wireless communication with the base station 20b by signals 60d to 60f. The base stations 20a and 20b, the server 40 and the indicator terminal 50 perform communication via the internet 30 by using signals 71 to 74.

The wireless terminal with sensing function transmits a measured result of the sensor and information such as data (second information) to the base station 20 by intermittent operation. In a cellular phone and wireless LAN, the terminal is almost constantly in receiving standby state. The base station can start transmission to the terminal at any time. In this embodiment, transmission of information such as a command or data from the base station 20 (first information) to the wireless terminal with sensing function 10 permitting intermittent operation can be realized by using the period in which power is supplied to bring the wireless terminal 10 to receiving state. For the wireless terminal with sensing function 10 performing intermittent operation, the base station 20 stores data to be transmitted until the period in which power is supplied for receiving state comes.

Here, the configurations of the wireless terminal with sensing function 10 and the base station 20 will be described below.

Figure 2:
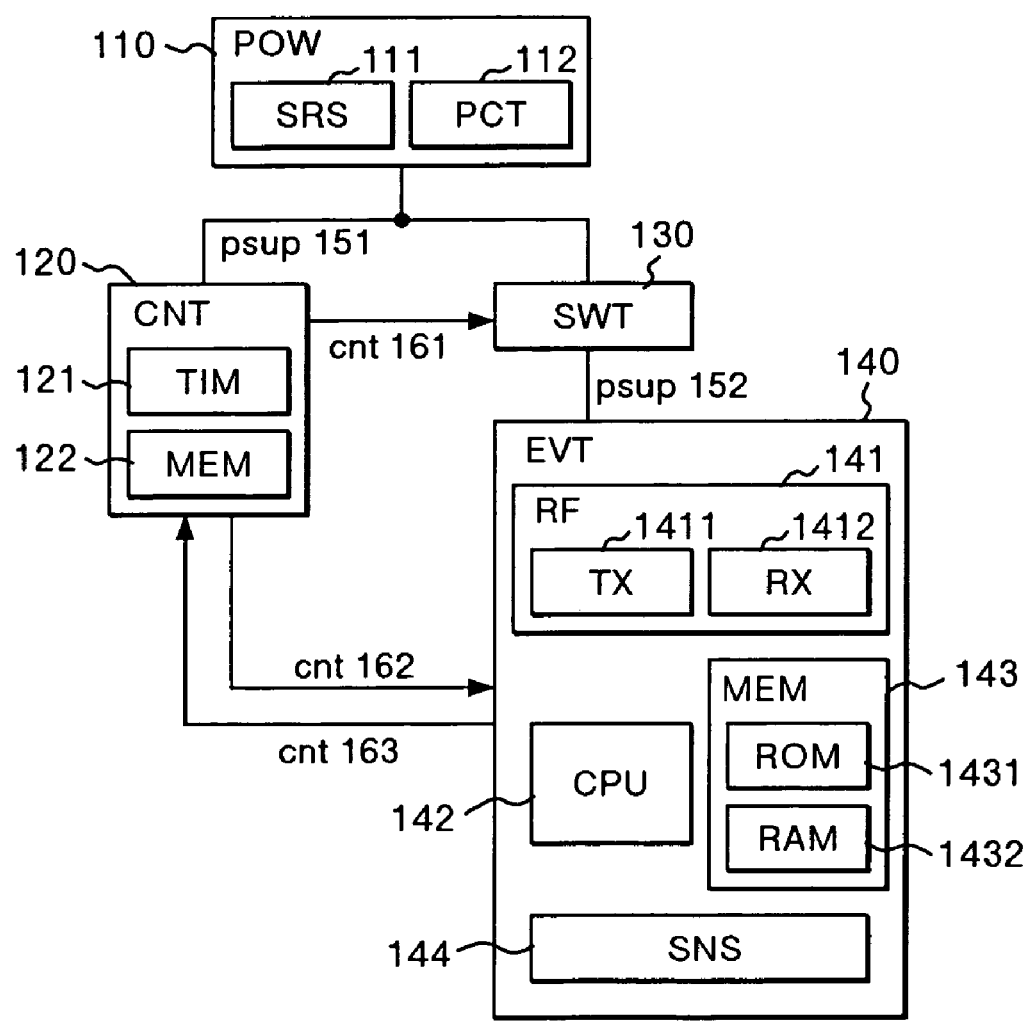
FIG. 2 is a block diagram of assistance in explaining a wireless terminal with sensing function used in Embodiment 1.

FIG. 2 shows the configuration of the wireless terminal with sensing function 10. The wireless terminal 10 includes a power source area (POW) 110, a successive operating area (CNT) 120, an event-start area (EVT) 140, and a power switch (SWT) 130. An event refers to that transmission time has come, that is, time, in the case that the sensor is a thermometer and periodically transmits a temperature measured result, and to earthquake occurrence in the case that the sensor is a seismometer. Other various events can be assumed. For instance, the successive operating area 120 may be provided with an electromagnetic sensor including light and provide an electromagnetic wave including light and a wireless communication signal itself as an event to the wireless terminal with sensing function 10. A fixed value (threshold) and an amount of change in generally sensingable physical quantity such as a temperature, humidity, illumination or acceleration can be also an event.

The power source area 110 comprises a power source (SRS) 111 and a power source control device (PCT) 112. The successive operating area 140 comprises an even-start unit (TIM) 121 and a memory (MEM) 122. The event-start area 140 comprises a wireless apparatus (RF) 141 including a transmitter (TX) 1411 and a receiver (RX) 1412, an operation unit (CPU) 142, a memory (MEM) 143 having a read only memory (ROM) 1431 and a random access memory (RAM) 1432, and a sensor (SNS) 144.

The power source area 110 supplies a supply voltage psup 151 to the successive operating area 120 and the power switch 130. The successive operating area 120 is operated by constantly supplying power. The power switch 130 supplies or shuts off the supply voltage psup 151 as a supply voltage psup 152 to the event-start area 140 according to a control signal cnt 161. The successive operating area 120 generates the control signal cnt 161 to the power switch 130 and transmits and receives control signals cnt 162 and cnt 163 between it and the event-start area 140 for transmitting and receiving data and the control signals. In the event-start area 140, when the supply voltage psup 152 is supplied, the sensor 144 measures information, the operation unit 142 performs data processing, the memory 143 performs operation control and data management, and the wireless apparatus 141 performs wireless communication. When the supply voltage psup 152 is shut off, the operations are stopped.

Intermittent operation of the wireless terminal 10 is performed such that the event-start area 140 repeats operating state in which power is supplied and stop state in which power is shut off and the wireless terminal 10 repeats operating state and suspended state (sleep state).

The event-start unit 121 of the event-start area 140 is operated by constantly supplying power and judges an event to control the power supply to the event-start area 140 via the power switch 130. An event judged by the event-start unit 121 may be a detected result by a certain detection function in addition to time. The memory 122 is constantly operated until the power source 111 cannot supply power after the first operation of the wireless terminal 10 and serves to save necessary information obtained by the event-start area 140 at power off.

According to the above configuration, the wireless terminal with sensing function 10 can perform intermittent operation according to an event to reduce power consumption.

Figure 3:
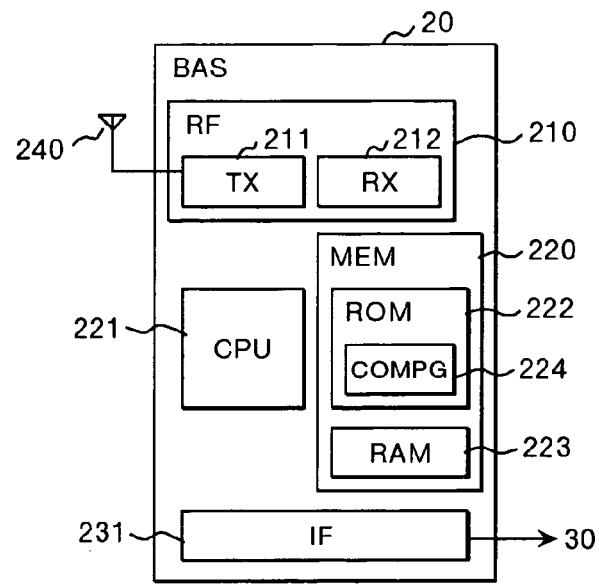
FIG. 3 is a block diagram of assistance in explaining an example of a base station used in Embodiment 1.

FIG. 3 shows the configuration of the base station 20. The base station 20 comprises a wireless apparatus 210, an antenna (ANT) 240, a controller (CPU) 221, a memory (MEM) 220, and an interface (IF) 231.

The wireless apparatus 210 comprises a transmitter (TX) 211 and a receiver (RX) 212. The memory 220 has a read only memory (ROM) 222 and a random access memory (RAM) 223. The base station 20 performs data communication by radio via the antenna 240 between it and the wireless terminal with sensing function 10 and performs data communication by wire via the interface 231 between it and another base station 20 and the server 40. A command or data transmitted from the server 40 is stored in the memory 220 in the base station 20 until it is supplied to the wireless terminal 10 by wireless communication. As described later in detail, the command or data stored in the memory 220 is coupled to a response signal sent back to the wireless terminal 10 to be transmitted to the wireless terminal 10. Control of such storing and transmission of the command or data is executed by the controller 221 according to a communication control program (COMPG) 224 stored in the read only memory 222.

Figure 4:
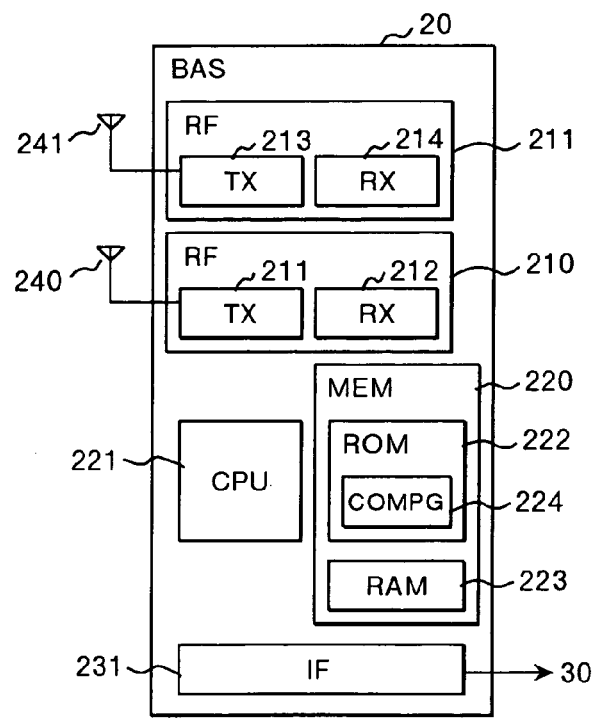
FIG. 4 is a block diagram of assistance in explaining another example of the base station used in Embodiment 1.

As shown in FIG. 4, the base station 20 can have two wireless apparatuses. It has the wireless apparatuses 210 and 211. An antenna having a better receiving sensitivity is used in communication between the base station 20 and the wireless terminal with sensing function 10. The reliability of communication can be maintained in an environment in which electric wave propagation is difficult.

Alternatively, a frequency bandwidth used for communication may be changed by two wireless apparatuses to perform communication with two wireless terminals with sensing function 10 at the same time. One of the two wireless apparatuses may be used for communication with a node and the other may be used for communication between the base stations.

The structure of a data frame used for communication between the base station 20 and the server 40 is as follows. First, it is capsuled by TCP/IP. In the simplest mounting, a frame used for wireless communication may be used as it is. Alternatively, simplified format conversion may be performed in a text form. In sophisticated mounting, the frame is converted to a format in a text form structured as in XML (Extensible Markup Language).

Figure 5A:
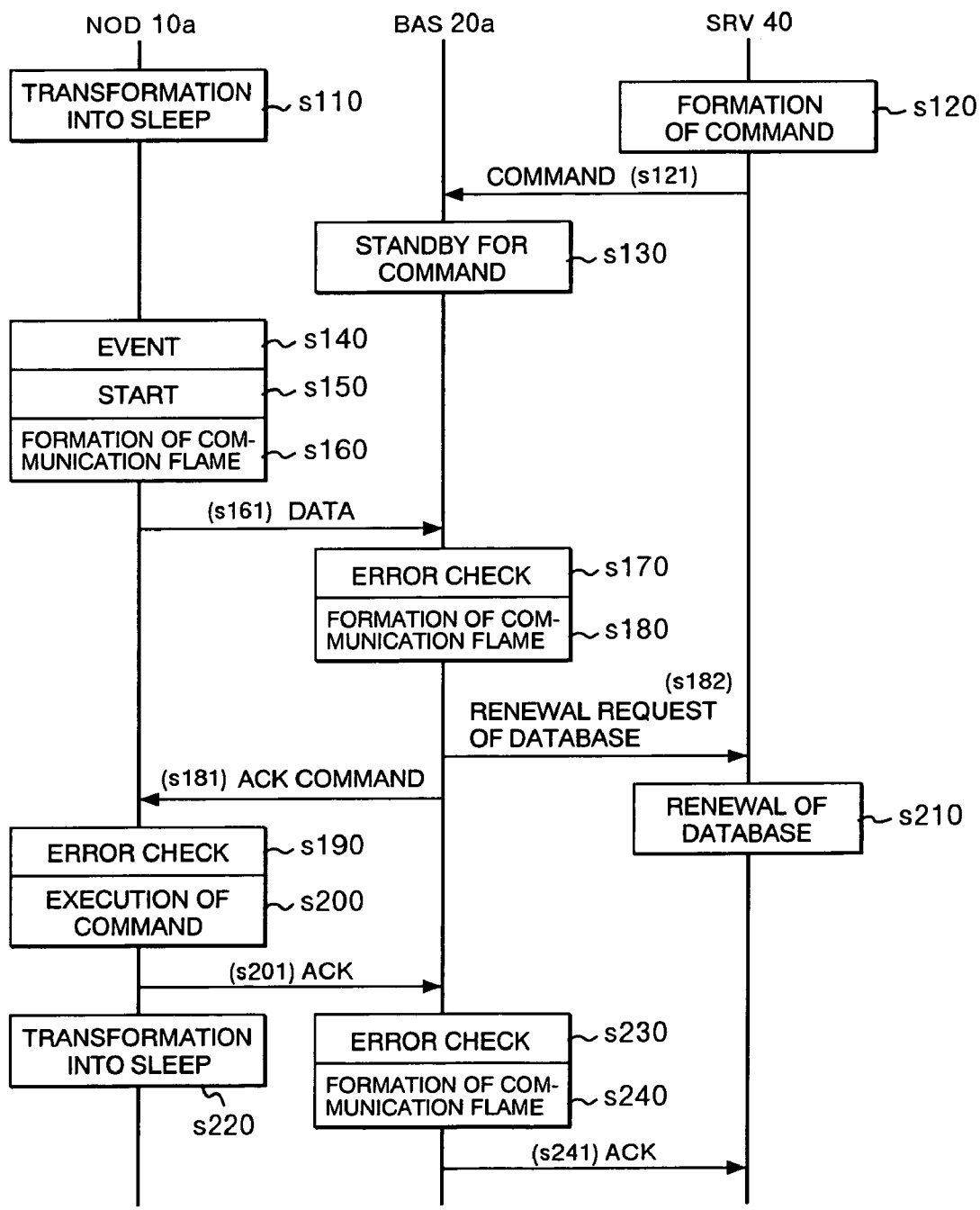
FIG. 5A is a sequence diagram of assistance in explaining Embodiment 1 of a method of communication according to the present invention.

FIG. 5A shows an example of a communication sequence transmitting information from the base station 20a or the server 40 to the wireless terminal with sensing function 10a performing the above-described intermittent operation. In intermittent operation in which the wireless terminal 10a repeats operation and suspension by supplying and shutting off power according to an event, the base station 20a holds information such as a command or data supplied to the wireless terminal 10a and reliably transmits the information when the wireless terminal 10a is in operating state.

While the wireless terminal 10a is in sleep state (s110), in the case that the server 40 forms a command for controlling the wireless terminal 10a (s120), the command is transmitted to the base station 20a (s121). The base station 20a stores the command for standby (s130).

The wireless terminal 10a starts to operate (s150) by supplying power in the case that an event (s140) such as time occurs and carries out data measurement using the sensor 144 and operation processing to form a communication frame for transmitting data to the base station 20a (s160). The formed communication frame transmits the data to the base station 20a (s161).

The base station 20a checks whether the received data is correctly received (s170) to form a communication frame to be responded to the wireless terminal 10a and the server 40 (s180). The base station 20a performs communication of request of renewal of database s182 to supply sensor data supplied from the wireless terminal 10a to the server 40. The server 40 renews data of the incorporated database 41 (s210). Communication between the base station 20 and the server 40 is based on TCP/IP. There is incorporated a mechanism in which the request of renewal of database s182 is communicated by the TCP/IP to transmit the data from the base station 20 to the server 40, and subsequently, an ACK signal as a response indicating that the data is correctly received is sent back from the server 40 to the base station 20.

When the base station 20 receives the ACK signal from the server 40, it transmits to the wireless terminal 10 the ACK signal as a response indicating that the information is correctly received. The base station 20a in which the command from the server 40 is stored couples the ACK signal to the command information to transmit an ACK command (s181) to the wireless terminal 10a.

The wireless terminal 10a receives the ACK command (s181) to perform error check (s190) whether the information can be correctly received and then executes the command transmitted from the server 40 (s200). When the command is normally executed, the ACK signal (s201) as a response signal is transmitted to the base station 20a and the wireless terminal 10a is transformed into sleep state (s220) by power off again.

When the base station 20a receives the ACK signal, it performs error check (s230) to form a communication frame (s240) for transferring the ACK signal of the wireless terminal 10a to the server 40 as the ACK (s241) to the server 40.

The detail of the operation of the wireless terminal 10a in the communication sequence and the detail of the communication frame formed by the wireless terminal 10a are common to other later embodiments and will be described together later.

According to the above communication sequence, during steps s170 to s190 in which the wireless terminal with sensing function 10a in intermittent operation is in receiving state, the base station 20 performs transmission. Information such as a command or data can be reliably transmitted to the wireless terminal 10a.

When intermittent operation is performed to reduce power consumption of the wireless terminal with sensing function 10a, in order to transmit information such as a command for controlling the wireless terminal 10a or data supplied to the wireless terminal 10a from the indicator terminal 50, the server 40 or the base station 20, the command or data is stored once in the base station 20a and the base station 20a couples the ACK signal as a response indicating that the wireless terminal 10a transmits sensor information to the command or data and sends it back, permitting highly reliable information transmission with high accuracy.

When the wireless terminal with sensing function 10 is attached to distribution merchandise to be used for temperature-history tracing of merchandise, change in temperature with time is slow and the frequency of measurement by the sensor is low. Target merchandise may be moved and, in the case that wireless communication with the base station 20 is difficult in distance, a multi-hop function in which data is transmitted via another wireless terminal 10 to the base station 20 is important. In the case of an application in which the target is buried into the ground to measure an amount of water to detect the possibility of mudslide disaster, it cannot be moved. The frequency of measurement must be always changed by rainfall.

As in these examples in which the target is moved or not or the frequency of measurement is changed, in the case that operating state or performance of the wireless terminal with sensing function 10 must be dynamically changed, as in the present invention, it is essential to supply a command to the wireless terminal for controlling its operation.

In the above and later description, communication between the wireless terminal with sensing function 10 and the base station 20 is not always wireless communication. For instance, wire communication can execute the same communication sequence. A communication system having a plurality of wireless terminals with sensing function 10 and a plurality of base stations 20 without the internet 30, server 40 and indicator terminal 50 can execute the same communication system. Information transmitted by the wireless terminal with sensing function 10 is not limited to sensor information measured and includes information such as an identifier (ID) owned by the device.

In the prior art communication sequence which does not perform intermittent operation, represented by a cellular phone and wireless LAN, in the case of end-to-end transmitting data or a command, the ACK signal is also end-to-end transmitted in the direction opposite the data or command. The communication sequence shown in FIG. 5A between the wireless terminal with sensing function 10a and the server 40 can be end-to-end. The command is transmitted from the server 40 to the wireless terminal with sensing function 10a by the command transmission s121 and the ACK command transmission s181. To the command, the ACK is transmitted reversely from the wireless terminal with sensing function 10a to the server 40 by the ACK signal s201 and the ACK transfer s241.

Figure 5B:
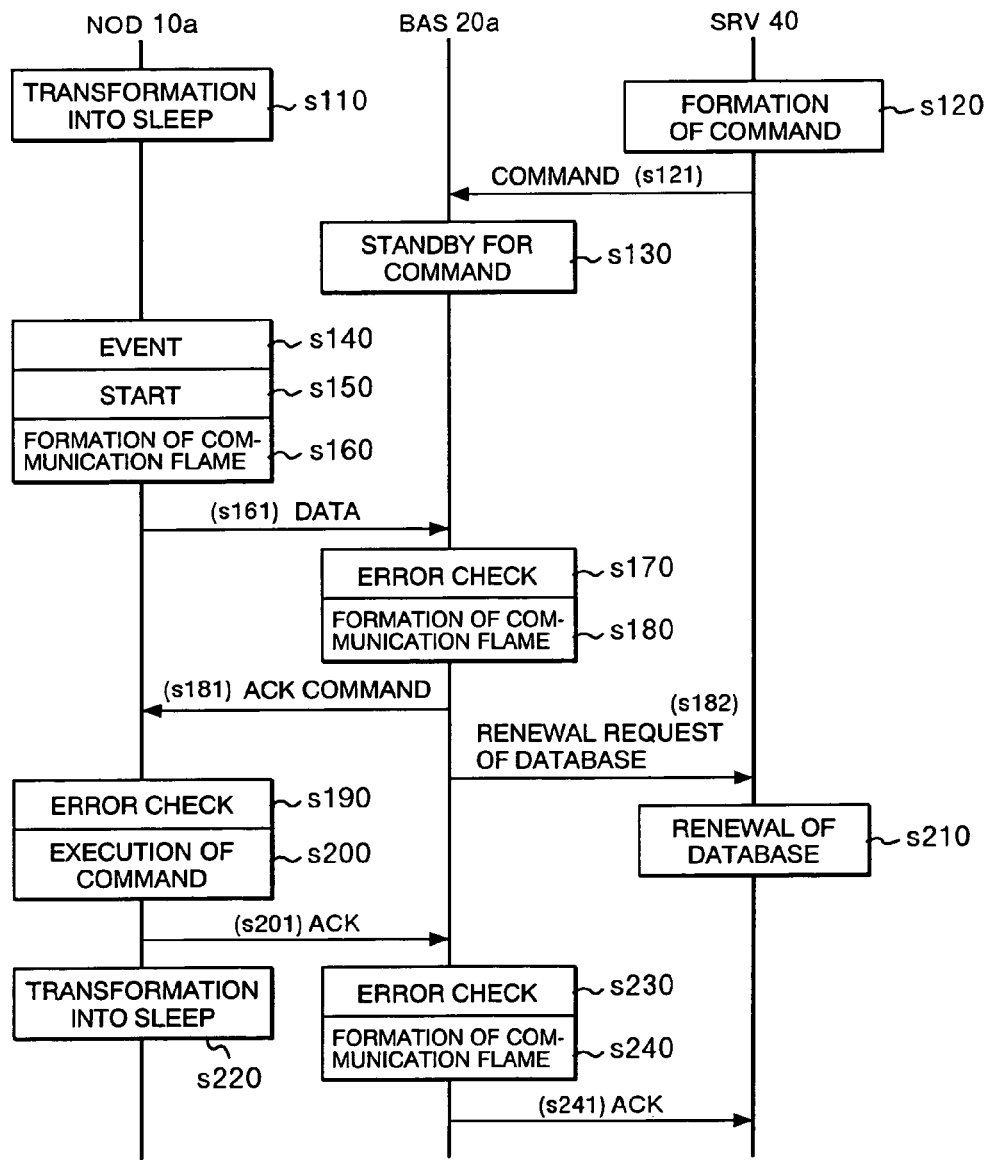
FIG. 5B is another sequence diagram of assistance in explaining Embodiment 1 of a method of communication according to the present invention.

In such sequence, the server 40 issuing a command is in receiving state during a relatively long period from execution of the command transmission s121 to receiving of the ACK by the ACK transfer s241. This is not a problem since the server 40 is constantly operated. The wireless terminal with sensing function 10a is required to reduce power consumption. Time reduction in receiving state from the data transmission s161 to the base station 20a to the ACK command receiving s181 is preferable. As described above, communication between the base station 20a and the server 40 is based on TCP/IP. There is incorporated a mechanism in which the ACK is sent back from the server 40 to the base station 20a after performing communication of the request of renewal of database s182 by the TCP/IP. After the wireless terminal with sensing function 10a transmits data by the data transmission s161, the base station 20a performs sending back by the ACK command transmission s181 immediately and can transmit the request of renewal of database s182 to the server 40. FIG. 5B shows an example of communication employing such sequence. Sending back ACK is divided for each section to shorten the ACK receiving standby time after data transmission, thereby reducing the operation time. As a result, the effect of reducing power consumption by intermittent communication operation of the wireless terminal with sensing function 10a performing intermittent operation can be further improved.

Figure 5C:
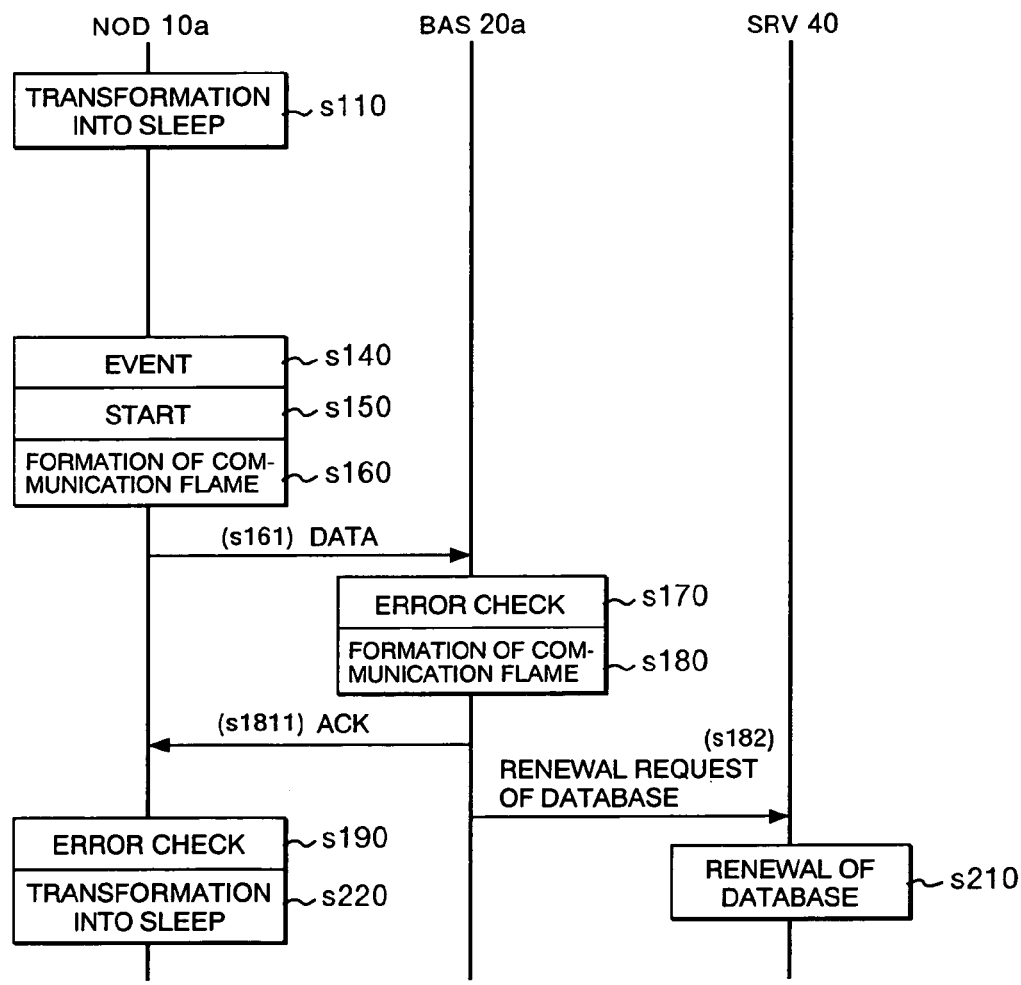
FIG. 5C is a further sequence diagram of assistance in explaining Embodiment 1 of a method of communication according to the present invention.
Figure 20:
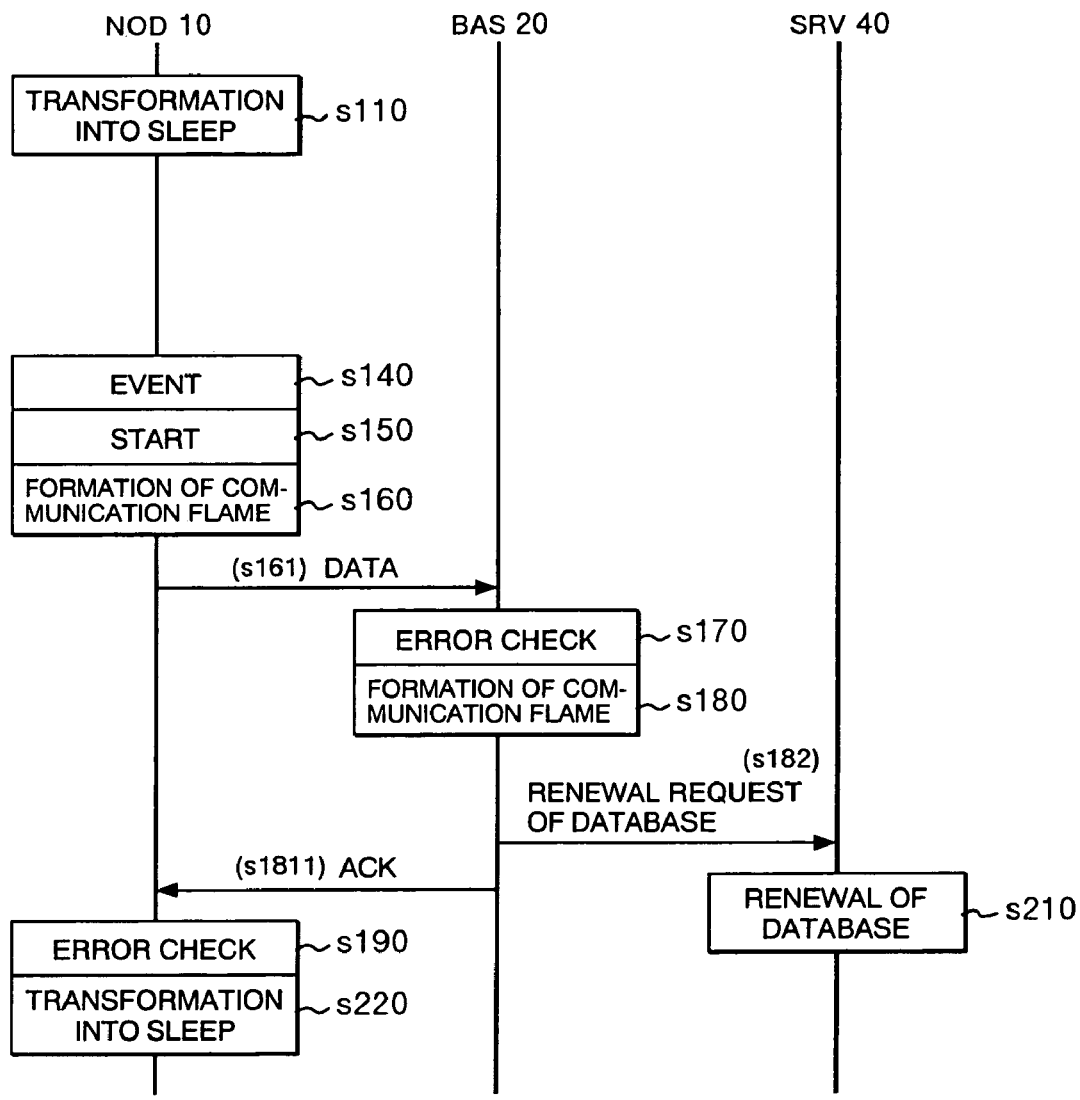
FIG. 20 is a sequence diagram of assistance in explaining an example of a method of communication performed using a wireless terminal with sensing function performing intermittent operation.

FIG. 5B shows an example in which the command transmission s121 is performed from the server 40. As shown in FIG. 20, in the case that without the command transmission s121, the wireless terminal with sensing function 10 performs data transmission, the time reduction sequence can be employed. An example of such sequence is shown in FIG. 5C. After the wireless terminal with sensing function 10 transmits data by the data transmission s161, the base station 20 performs sending back by the ACK command transmission s181 immediately to transmit the request of renewal of database s182 to the server 40. Without the command transmission s121, the ACK receiving standby time after data transmission is shortened to reduce the operation time.

Embodiment 2

In the communication system shown in FIG. 1, the wireless terminal with sensing function 10 does not perform measurement by the sensor and wireless communication of information at the same time depending on a measured target and may be operated to repeat a sequence in which measurement is performed several times to perform wireless communication once. In this case, the wireless terminal with sensing function 10 may be continuously operated between measurement operation and wireless communication operation or may perform intermittent operation by employing sleep. In Embodiment 2, a method of communication in which a command is received from the server 40 by intermittent operation is shown.

Figure 6:
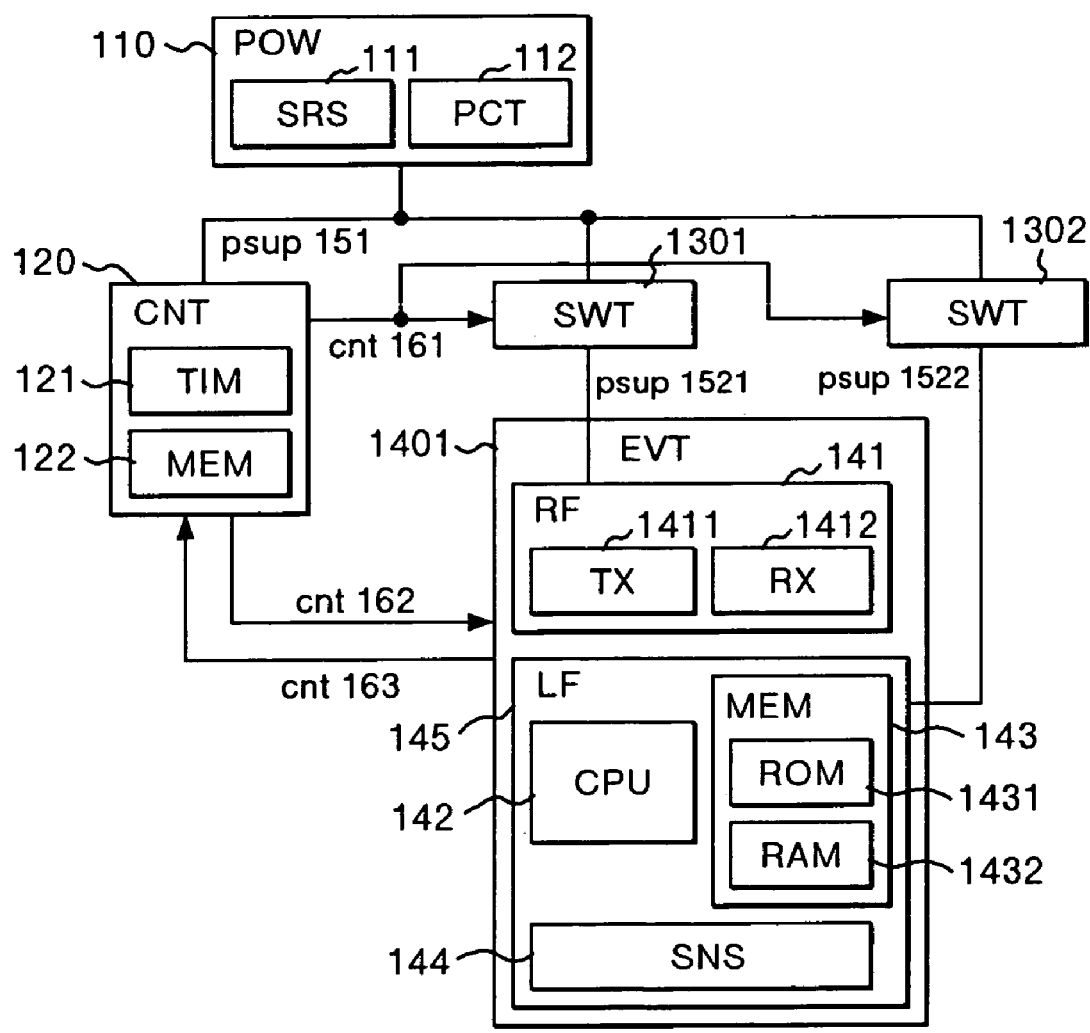
FIG. 6 is a block diagram of assistance in explaining a wireless terminal with sensing function used in Embodiment 2 of a method of communication according to the present invention.

FIG. 6 shows the configuration of a wireless terminal with sensing function 10 used in this embodiment The wireless terminal with sensing function 10 includes a power source area (POW) 110, a successive operating area (CNT) 120, an event-start area (EVT) 1401, a plurality of power switches (SWT) 1301 and (SWT) 1302. The power source area 110 comprises a power source (SRS) 111 and a power source control device (PCT) 112. The successive operating area 120 comprises an event-start unit (TIM) 121 and a memory (MEM) 122. The event-start area 1401 comprises a wireless apparatus (RF) 141 including a transmitter (TX) 1411 and a receiver (RX) 1412, an operation unit (CPU) 142, a memory (MEM) 143 having a read only memory (ROM) 1431 and a random access memory (RAM) 1432, and a sensor (SNS) 143.

The power source area 110 supplies a supply voltage psup 151 to the successive operating area 120 and the power switches 1301 and 1302. The power switches 1301 and 1302 supply or shut off the supply voltage psup 151 as supply voltages psup 1521 and psup 1522 to the event-start area 1401 according to a control signal cnt 161.

The event-start area 1401 is divided into an area of the wireless apparatus 141 receiving the power supply of the supply voltage psup 1521 by the power switch 1301 and an area of a low-frequency apparatus (LF) 145, other than the wireless apparatus 141, receiving the power supply of the power source signal sup 1522 by the power switch 1302.

The successive operating area 120 generates the control signal cnt 161 of the power switch 130 and transmits and receives control signals cnt 162 and 163 between it and the event-start area 1401 to transmit and receive data or the control signals.

In the event-start area 1401, when the supply voltage psup 1522 is supplied, a sensor 144 measures information, the operation unit 142 performs data processing, and the memory 143 performs operation control and data management. When the supply voltage psup 1521 is supplied, the wireless apparatus RF 141 performs wireless communication. When the supply voltages psup 1521 and 1522 are off, the operations are stopped.

Intermittent operation of the wireless terminal 10 is performed by intermittent operation of the event-start area 140 repeating operating state in which power is supplied and stop state in which power is shut off. Control of supply and shutting off power can be performed separately by the wireless apparatus 141 and the low-frequency apparatus 145.

The event-start unit 121 is operated by constant supply of power and judges an event to control the power supply to the event-start area 1401 via the power switches 1301 and 1302. The event judged by the event-start unit 121 may be a measured result by a certain measuring function in addition to time. The memory 122 is constantly operated until the power source 111 cannot supply power after the first operation of the wireless terminal with sensing function 10 and serves to save necessary information obtained by the event-start area 1401 at power off.

According to this configuration, the wireless terminal with sensing function 10 can perform intermittent operation according to a plurality of events. The power consumption for measurement by the sensor 144 is different from the power consumption for wireless communication by the wireless apparatus 141. In the case that the power consumption for wireless communication is larger, the frequency of sensing and measurement is increased and the frequency of wireless communication is decreased to make it possible to reduce power consumption. The frequency of sensing and measurement and the frequency of wireless communication can be controlled by a command from the base station 20 or the server 40.

Figure 7:
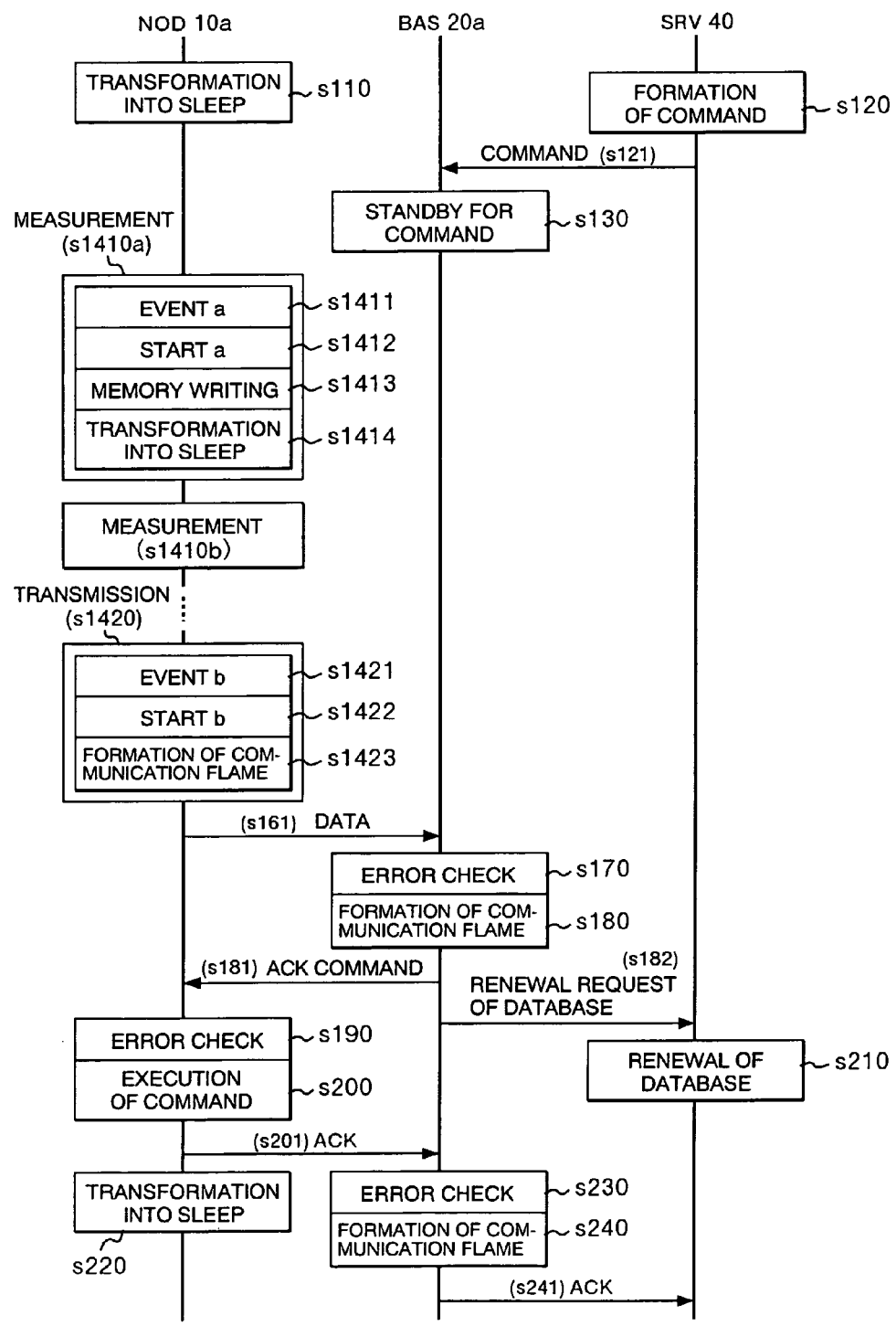
FIG. 7 is a sequence diagram of assistance in explaining Embodiment 2 of a method of communication according to the present invention.

A method of communication executed by the communication system of the above configuration will be described using the communication sequence shown in FIG. 7. FIG. 7 shows the communication state between the wireless terminal with sensing function (NOD) 10a, the base station (BAS) 20a and the server (SRV) 40.

While the wireless terminal with sensing function 10a is in sleep state (s110) by power off, when a command or data is formed from the server 40 or the base station 20*a*, the base station 20*a* temporality stores the command or data (s120, s121 and s130).

The wireless terminal 10*a* performs measuring operation (s1410*a*) by event a. The measuring operation is performed by the event a (a1411), start to operation a (s1412), memory writing (s1413) and transformation into sleep (s1414). To prevent measured information from disappearing by power off, measured data is transferred into the successive operating area just before the transition into sleep state.

After data obtaining several times, start to operation b (s1422) is performed with another event b (s1421), and to measured data are collected. Subsequently, a communication frame is formed to perform communication preparation (s1423). The formed communication frame transmits (s1420) the data to the base station 20*a* (s161).

The base station 20*a* checks whether the received data is correctly received (s170) to form a communication frame to be responded to the wireless terminal 10*a* and the server 40 (s180). The base station 20*a* in which a command from the server 40 is stored couples the ACK signal sent back to the wireless terminal 10*a* to the command information to transmit an ACK command (s181) to the wireless terminal 10*a*. The base station 20*a* performs communication (s182) to supply the sensor data supplied from the wireless terminal 10*a* to the server 40. The server 40 renews data of the incorporated database (DBS) 41 (s210).

The wireless terminal 10*a* receives the ACK command (s181) to perform error check whether the information can be correctly received (s190) to execute the command transmitted from the server 40 (s200). When the command is normally executed, an ACK (s201) as a response signal is transmitted to the base station 20*a* and the wireless terminal 10*a* is transformed into sleep state (s220) by power off again.

When the base station 20*a* receives the ACK signal, it performs error check (s230) to form a communication frame (s240) for transferring the ACK signal of the wireless terminal 10*a* as ACK (s241) to the server 40.

The power consumption for measurement by the sensor is different from the power consumption for wireless communication by the RF. In the case that the power consumption for wireless communication is larger, the frequency of the sensing and measurement s1410 is increased and the frequency of wireless communication s1420 to s220 is decreased to make it possible to reduce power consumption. The frequency of sensing and measurement and the frequency of wireless communication can be controlled by a command from the base station 20 or the server 40.

Embodiment 3

Figure 8:
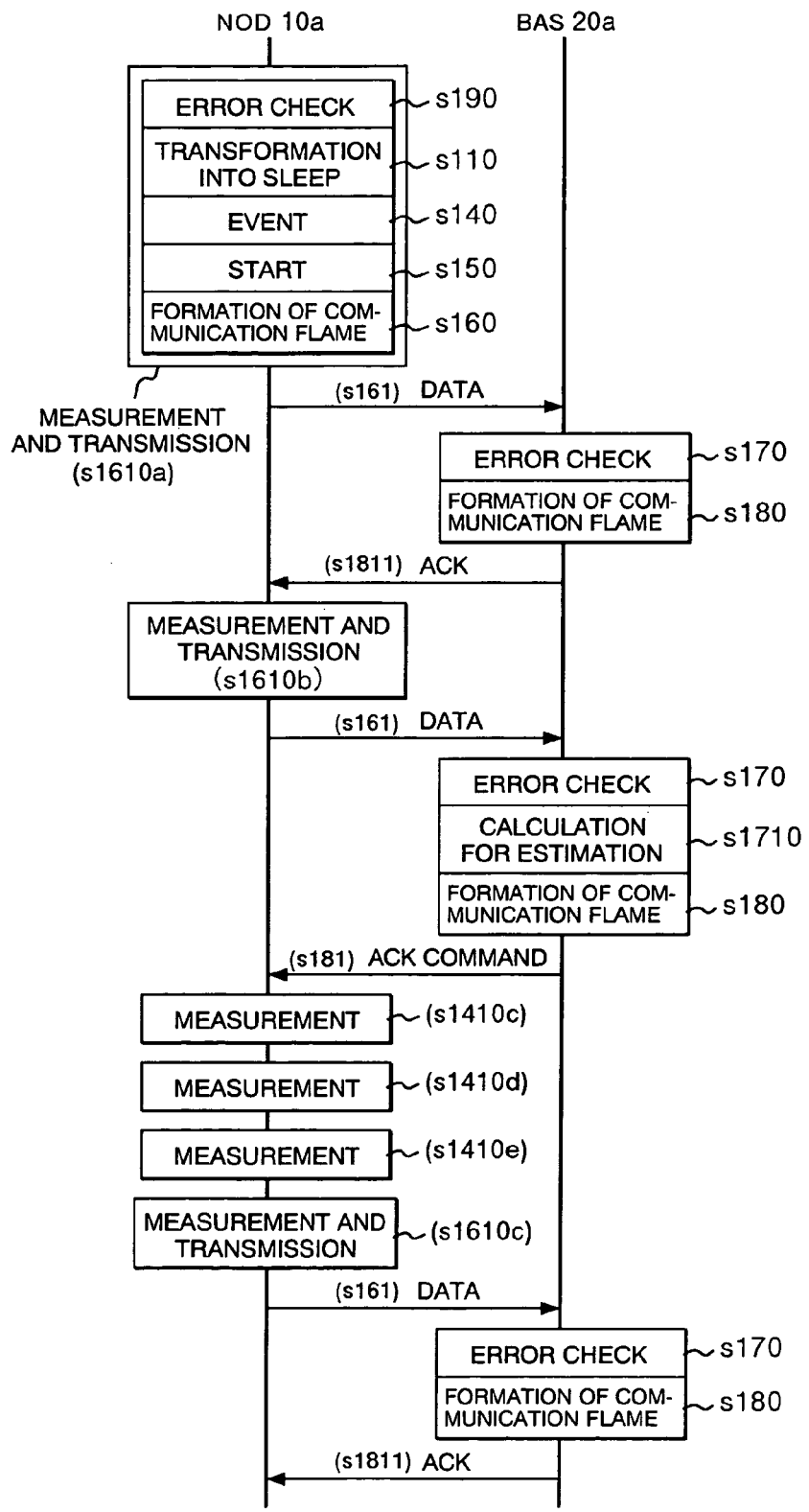
FIG. 8 is a sequence diagram of assistance in explaining Embodiment 3 of a method of communication according to the present invention.

FIG. 8 shows Embodiment 3 in which a measured value is estimated to reduce the frequency of wireless communication. In this embodiment, the communication sequence between the wireless terminal with sensing function (NOD) 10*a* and the base station (BAS) 20*a* is employed. First measurement and transmission (s1610*a*) is performed by the sequence of error check (s190), transformation into sleep (s110), event (s140), start to operation (s150), and formation of a communication frame (s160). The error check s190 shows check to the last-time ACK signal sent back from the base station 20*a*. The sequence of later measurement and transmission (s1610*b* and s1610*c*) is configured in the same manner.

The wireless terminal 10*a* is in suspended state by power off during the transformation into sleep s110 to the event s140, and is in operating state by supply of power during the event s140 to the transformation into sleep of the next measurement and transmission (s1610*b*).

When sensor data (s161) is transmitted from the wireless terminal 10*a*, the base station 20*a* performs error check (s170) of a receiving error to form a communication frame (s180) for a response signal, thereby sending back an ACK signal (s1811). The operation is repeated several times to stack the sensor data, estimating change in data.

Change in data is estimated in the base station 20*a*. The base station 20*a* receives the repeatedly transmitted sensor data s161 to perform the error check s170, and subsequently performs calculation for estimation (s1710). When judging that the later data can be estimated from the estimated result, the base station 20*a* transmits to the wireless terminal 10*a* an ACK command (s181) by including in the ACK signal a command for making only measurement plural times, then measurement and transmission (s1610*c*).

The estimating function can be provided in the wireless terminal 10*a*, not in the base station 20*a*. Both the wireless terminal 10*a* and the base station 20*a* have an estimated result. After estimation, whether a measured result obtained from sensing and measurement according to an event is different from the estimation is judged. When it is not different from the estimation, data transmission is unnecessary.

The wireless terminal 10*a* performs only sensing and measurement for each event. Measurement including only sensing and measurement (s1410*c*, s1410*d* and s1410*e*) can include the event (s140), start to operation (s150) and transformation into sleep (s110). When the measured result is different from estimation or transmission is necessary as periodic contact, the data s161 is transmitted from the wireless terminal 10*a* and the base station 20*a* performs the error check s170 and formation of communication frame s180. The base station 20*a* finally returns the ACK signal s1811 to the wireless terminal 10*a*.

Figure 9:
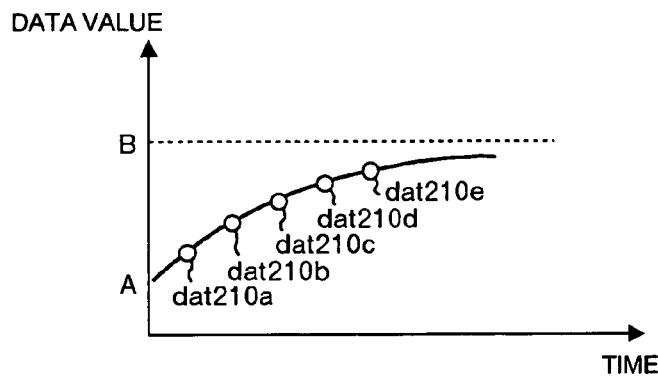
FIG. 9 is a diagram of assistance in explaining an example of estimation of sensor information according to the present invention.

A method of data estimation will be described using FIG. 9. In FIG. 9, the vertical axis indicates sensor data values and the horizontal axis indicates time. In this example, sensor data is temperature and an event is time. In FIG. 9, change in temperature measured with time is estimable change. When change in temperature is estimated by the following equation, $$\text{TEMPERATURE} = \frac{1}{\frac{1}{A-B} - \text{TIME}} + B$$

When at least two data values are obtained, the values of variables A and B are found, thereby estimating change in temperature.

The wireless terminal with sensing function 10*a* and the base station 20*a* can perform transmission and reception in intermittent operation. The variables A and B of the above equation can be shared by the wireless terminal 10*a* and the base station 20*a*. The wireless terminal 10*a* does not perform wireless communication in the period in which the above equation is the same as the measured result and performs transfer of measured data by wireless communication when the estimated value is different from the measured result. The frequency of wireless communication is lowered based on estimation to make it possible to reduce power consumption.

The sequence of the operations performed by the wireless terminal with sensing function 10*a* by a command from the base station 20, which is common in the above embodiments will be described using FIGS. 10 to 15. Typically, there are registration, transfer between base stations, mode transfer, re-writing of memory, dump memory, and reset and close.

Figure 10:
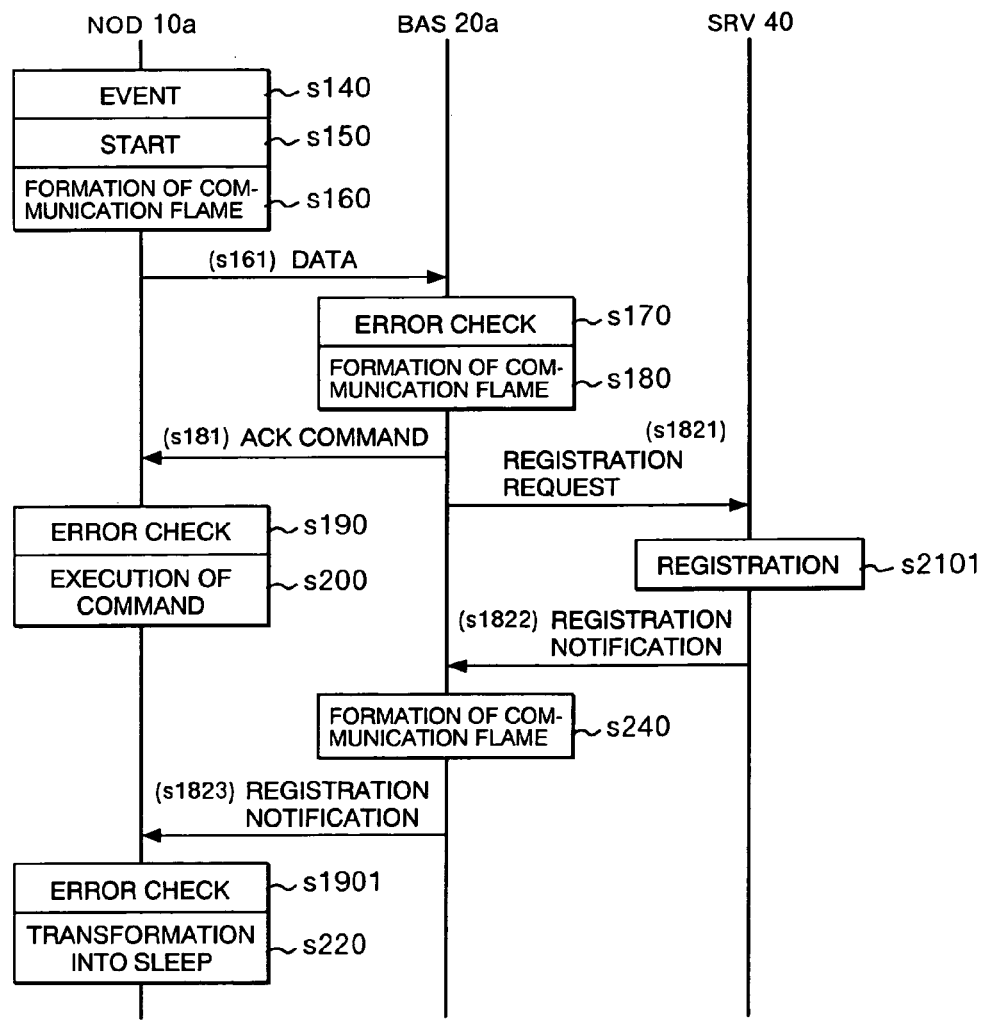
FIG. 10 is a sequence diagram of assistance in explaining an example of registration of a method of communication according to the present invention.

The registration of the wireless terminal (NOD) 10a can be performed by the sequence shown in FIG. 10. The registration is performed when the wireless terminal 10a identifies non-registration when the base station (BAS) 20a receives data (s161) from the wireless terminal with sensing function 10a. When non-registration is identified, the base station 20a supplies to the wireless terminal 10a by an ACK command (s181) a command for standby in receiving state until the next registration notification (s1823) is reached. The base station 20a transmits the registration request (s1821) to the server (SRV) 40. When the server 40 completes registration (s2101) of the wireless terminal 10a, it receives registration notification (s1822) to transmit registration notification s1823 to the wireless terminal 10a. The wireless terminal 10a which has received the registration notification s1823 is transformed into sleep state (s220).

Figure 11:
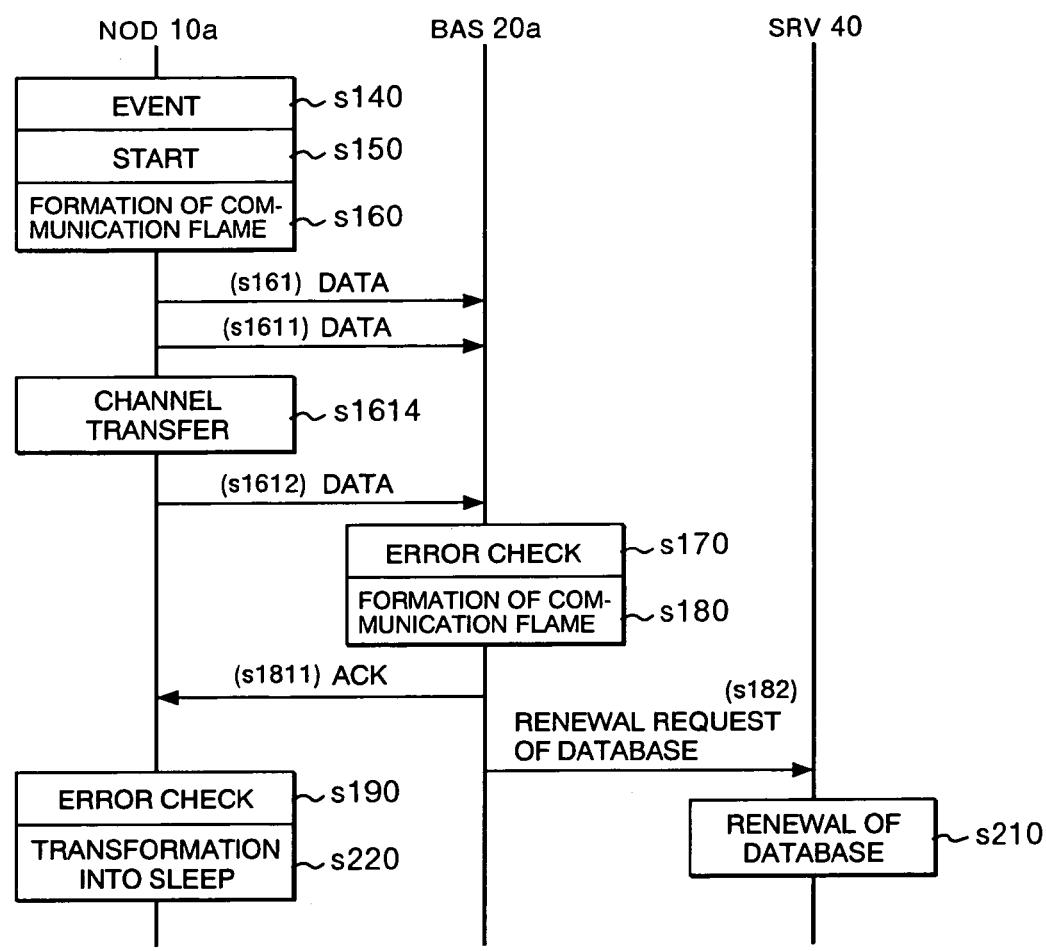
FIG. 11 is a sequence diagram of assistance in explaining an example of transfer between base stations of a method of communication according to the present invention.
Figure 12:
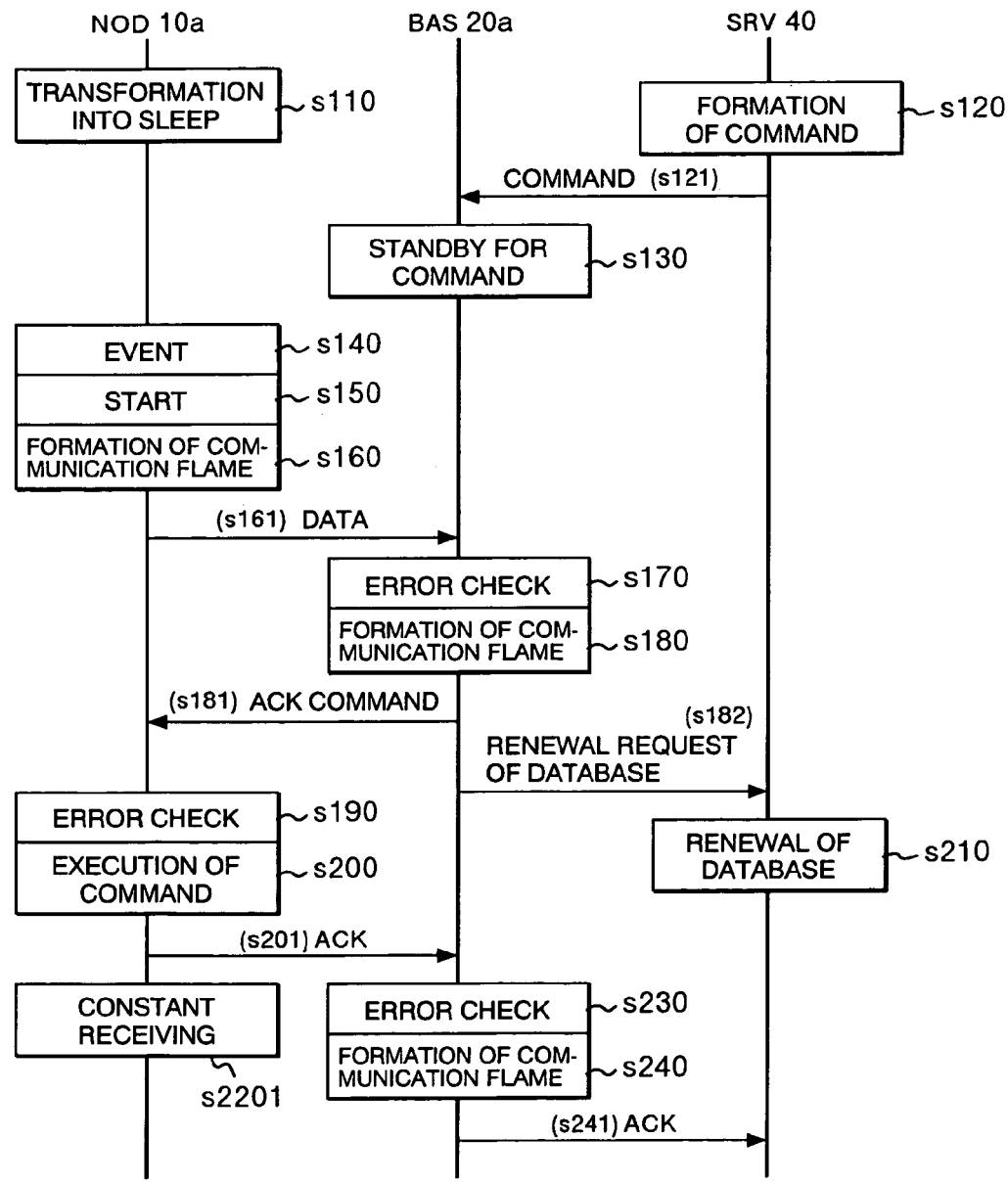
FIG. 12 is a sequence diagram of assistance in explaining an example of mode transfer of a method of communication according to the present invention.

The transfer between base stations of the wireless terminal with sensing function (NOD) 10a can be performed by the sequence of FIGS. 10 and 11. When the wireless terminal 10a is moved to change the corresponding base station (BAS) 20a and the ID (identifier) of the wireless terminal 10a is identified by the registration information of the base station 20a, the registration of FIG. 10 is performed again to permit transfer between base stations.

When the base stations (BAS) 20a having different frequency channels are dispersed, as shown in FIG. 11, the wireless terminal (NOD) 10a searches for the frequency channel of the base station 20a therenear to perform transfer to the base stations 20a. In FIG. 11, since the wireless terminal 10a has a communication frequency channel different from that of the base station 20a, transmitted data (s161 and s1611) cannot be transmitted. The wireless terminal 10a transmits data and is standby in receiving state until an ACK signal is responded. In the ACK is not returned for over a certain point of time, transmission is tried again. The re-transmission is performed several times, and when the ACK is not reached, the channels are automatically transferred (s1614). The channel transfer operation is continued until the ACK The mode transfer of the wireless terminal with sensing function (NOD) 10a can be performed by the sequence of FIGS. 12 and 13. Transfer from intermittent operation to constant receiving mode is performed by the sequence of FIG. 12. Transfer to constant receiving mode is commanded by an ACK command (s181) from the base station (BAS) 20a or the server (SRV) 40. Constant receiving mode (s2201) is standby in receiving state.

Figure 13:
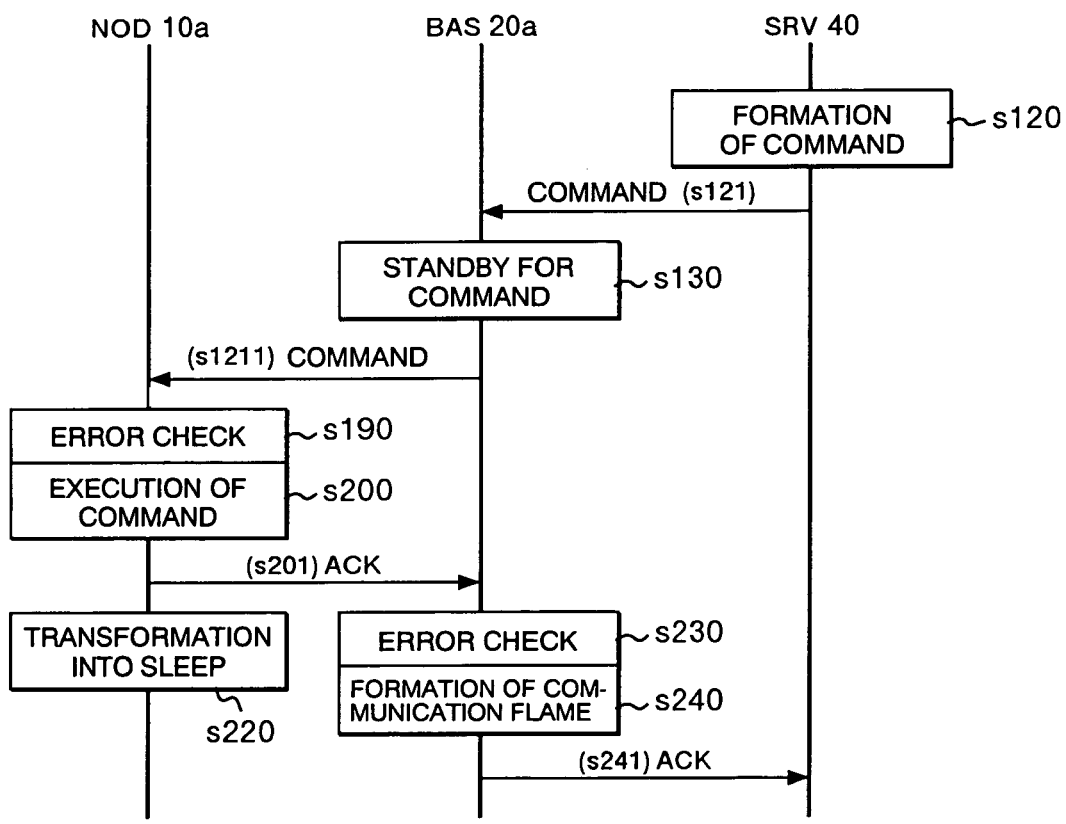
FIG. 13 is a sequence diagram of assistance in explaining another example of the mode transfer of a method of communication according to the present invention.

Transfer from constant receiving mode to intermittent state is performed by the sequence of FIG. 13. When the wireless terminal with sensing function (NOD) 10a is in constant receiving state, the base station (BAS) 20a can directly transmit a command to the wireless terminal 10a (s1211) without storing command data from the server (SRV) 40 or command data of the base station 20a itself. The wireless terminal 10a which has received the command s1211 is in sleep state (s220) and is returned to intermittent operation.

The re-writing of memory of the wireless terminal with sensing function (NOD) 10a can be performed by the sequence of FIG. 5. For re-writing of memory, a command for re-writing of memory may be supplied in the command transmission (s181) of FIGS. 5A, 5B.

Figure 14:
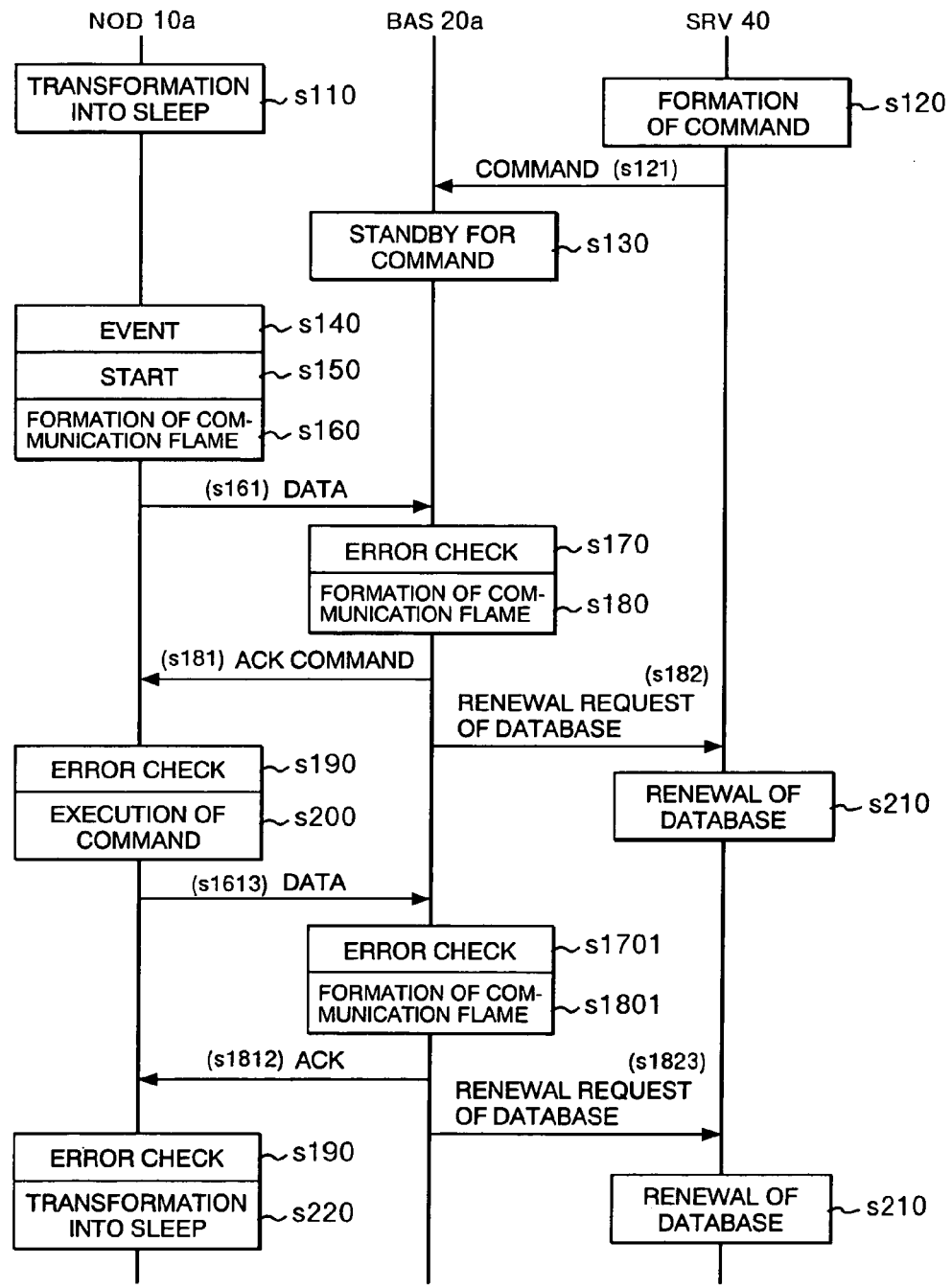
FIG. 14 is a sequence diagram of assistance in explaining an example of dump memory of a method of communication according to the present invention.

The dump memory of the wireless terminal with sensing function (NOD) 10a can be performed by the sequence of FIG. 14. In this case, the contents of memory are dumped as data (s1613) to an ACK command (s181) from the server (SRV) 40 or the base station (BAS) 20a.

Figure 15:
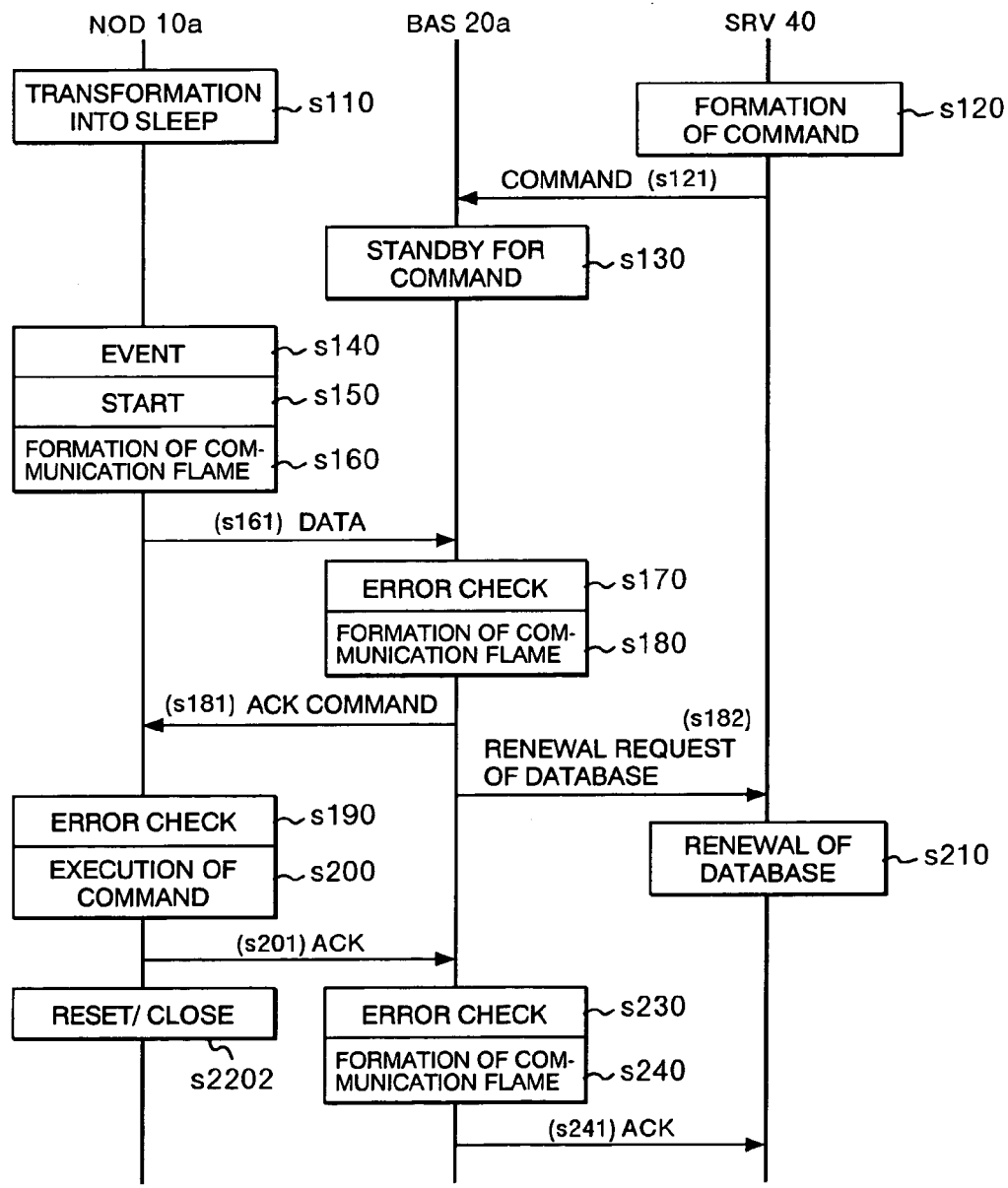
FIG. 15 is a sequence diagram of assistance in explaining an example of reset and close of a method of communication according to the present invention.

The reset and close of the wireless terminal with sensing function (NOD) 10a can be performed by the sequence of FIG. 15. The wireless terminal 10a can be closed or reset by a command from the base station (BAS) 20a or the server (SRV) 40. Finally, the reset or close (s2202) is performed instead of transformation into sleep.

Figure 16:
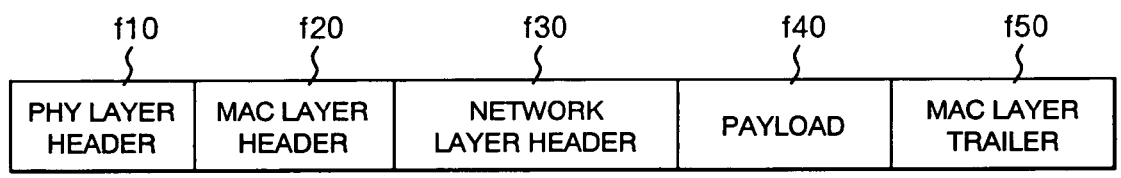
FIG. 16 is a block diagram of assistance in explaining an example of a communication frame used in a method of communication according to the present invention.

An example of a communication frame formed when communication is performed will be described using FIGS. 16 to 19. As shown in FIG. 16, a communication frame comprises a PHY (physical) layer header (f10), a MAC (media access) layer header (f20), a network layer header (f30), a payload (f40), and a MAC layer trailer (f50).

Figure 17:
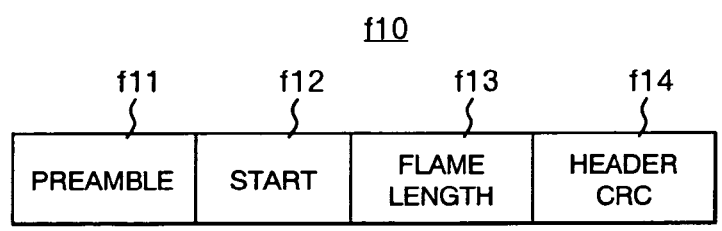
FIG. 17 is a block diagram of assistance in explaining a PHY (physical) layer header of the communication frame of FIG. 16.

As shown in FIG. 17, the PHY layer header f10 comprises a preamble (f11) for signal synchronization, start (f12) indicating start of data, a frame length (f13) indicating the length of all frames, and an error detecting function (f14) of the PHY layer header portion. Since it has information on the frame length f13, the length of a communication frame can be varied.

Figure 18:
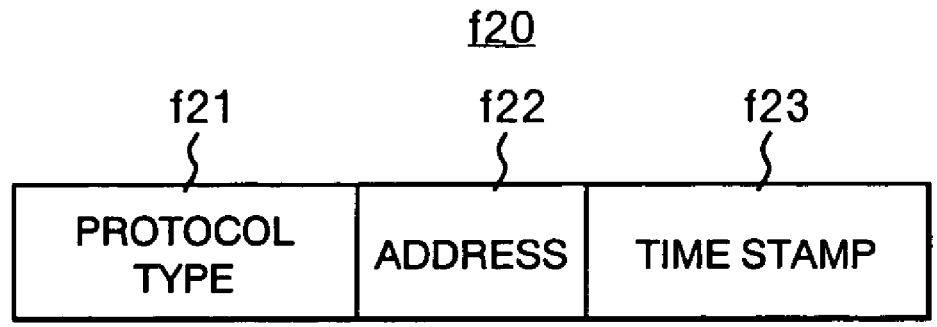
FIG. 18 is a block diagram of assistance in explaining a MAC (media access) layer header of the communication frame of FIG. 16.

As shown in FIG. 18, the MAC layer header f20 comprises a protocol type (f21) indicating the version of a protocol, an address (f22) indicating the ID or address information of the wireless terminal with sensing function, and a time stamp (f23) for including time information in wireless communication. Since it has the protocol type f21, a plurality of different protocols can coexist in the same communication system. The ID/address information f23 has only that of the wireless terminal with sensing function 10. The base station 20 to be communicated each time the wireless terminal 10 is moved is changed. The communication frame includes only information of the wireless terminal 10 and the communication frame can be shortened. The wireless terminal can be freely managed in any of the base station, server and indicator terminal. The time stamp information f23 uses the information of the timer of the wireless terminal with sensing function itself. A time error between the wireless terminal and the base station 20 or the server 40 is constantly measured. When needed, time at which data measurement and transmission are performed can be converted.

Figure 19:
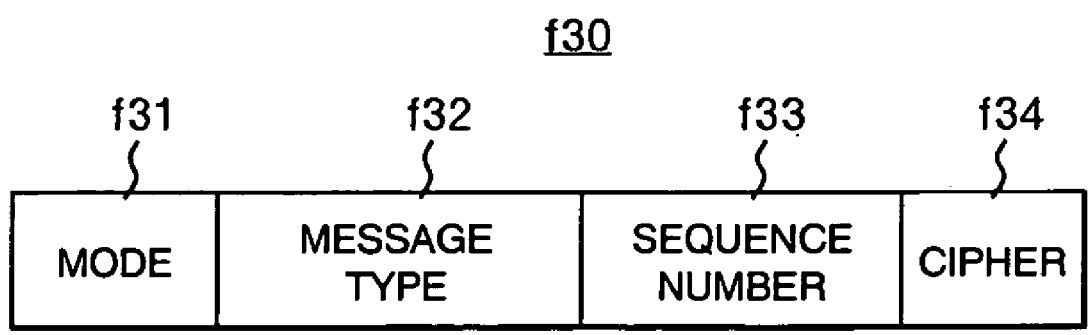
FIG. 19 is a block diagram of assistance in explaining a network layer header of the communication frame of FIG. 16.

As shown in FIG. 19, the network layer header f30 comprises a mode (f31) for transferring the mode of intermittent operation and constant receiving operation, a message type (f32) indicating that a message is any one of data/ACK/command/ACK command/registration, a sequence number (f33), and a cipher (f34). The sequence number f33 is combined with the ID/address f22 or the time stamp f23 to prevent the same information from being overlapped in the base station 20, the server 40 and the indicator terminal 50 for use. The sequence number f33 can be the same number for transmitting measured data under the same condition and must be renewed when transmitting data. It can be changed when needed.

The payload f40 is ciphered and deciphered when the cipher f34 includes an instruction about the cipher. When a communication system in which cipher is normally unnecessary needs cipher under a special condition, cipher can be dynamically mixed during system operation.

The MAC layer trailer f50 performs error detection to all frames excluding the PHY layer header f10.

According to the present invention, when performing wireless communication in order that the wireless terminal with sensing function can transmit sensor information to the base station, in a system which can reduce power consumption by intermittent operation in which the wireless terminal with sensing function repeats power on and off, a command or data from the base station, server or indicator terminal is stored in the base station to be transmitted reliably while the wireless terminal with sensing function is operated, thereby realizing wireless transmission and reception with low power, high reliability and high accuracy.

It is further understood by those skilled in the art that the foregoing description is a preferred embodiment of the disclosed device and that various changes and modifications may be made in the invention without departing from the spirit and scope thereof.

What is claimed is:

1. A method of communication which is performed between a wireless terminal and a base station, the wireless terminal comprising a sensor and a wireless apparatus, comprising the steps of:
   transforming the sensor from first suspended state into first operating state;
   measuring sensor data with the sensor in the first operating state;
   transforming the sensor from the first operating state into the first suspended state after measuring sensor data;
   repeating the first operating state and the first suspended state;
   transforming the wireless apparatus from second suspended state into second operating state based on a plurality of the first operating state;
   transmitting with the wireless apparatus in the second operating state a plurality of sensor data measured by the sensor in the plurality of the first operating state to the base station after measurement with the sensor in the plurality of the first operating state;
   receiving the plurality of sensor data with the base station;
   transmitting information for the wireless terminal to the wireless terminal with the base station;
   transforming the wireless apparatus from the second operating state into the second suspended state after receiving the information for the wireless terminal; and
   repeating the second operating state and the second suspended state.

2. The method of communication according to claim 1, wherein the wireless apparatus transmits the plurality of sensor data to the base station so as not to overlap with measurement of the sensor in the plurality of the first operating state.

3. The method of communication according to claim 1, wherein the sensor is transformed from the first suspended state into the first operating state based on a value or an amount of change in a physical quantity measured by the wireless terminal.

4. The method of communication according to claim 1, further comprising the step of:
   estimating a result of the measurement with the sensor, wherein the wireless terminal does not transmit the measured data when the result of the measurement with the sensor is matched with the estimated result.

5. A wireless terminal comprising:
   a sensor which is transformed from first suspended state into first operating state, measures sensor data in the first operating state, is transformed from the first operating state into the first suspended state after measuring sensor data, and repeats the first operating state and the first suspended state; and
   a wireless apparatus which is transformed from second suspended state into second operating state based on a plurality of the first operating state, transmits in the second operating state a plurality of sensor data measured by the sensor in the plurality of the first operating state to a base station after measurement with the sensor in the plurality of the first operating state,
   wherein the wireless apparatus is transformed from the second operating state into the second suspended state after receiving the information for the wireless terminal which is transmitted by the base station receiving the plurality of sensor data, and
   the wireless apparatus repeats the second operating state and the second suspended state.

6. The wireless terminal according to claim 5, wherein the wireless apparatus transmits the plurality of sensor data to the base station so as not to overlap with measurement of the sensor in the plurality of the first operating state.

7. The wireless terminal according to claim 6, wherein the sensor is transformed from the first suspended state into the first operating state based on a value or an amount of change in a physical quantity measured by the wireless terminal.

8. The wireless terminal according to claim 5, wherein the wireless terminal estimates a result of the measurement with the sensor, and the wireless terminal does not transmit the measured data when the result of the measurement with the sensor is matched with the estimated result.

9. A network system comprising
   a wireless terminal which includes
   a sensor which is transformed from first suspended state into first operating state, measures sensor data in the first operating state, is transformed from the first operating state into the first suspended state after measuring sensor data, and repeats the first operating state and the first suspended state, and
   a first wireless apparatus which is transformed from second suspended state into second operating state based on a plurality of the first operating state, transmits in the second operating state a plurality of sensor data measured by the sensor in the plurality of the first operating state to a base station after measurement with the sensor in the plurality of the first operating state; and
   a base station which includes
   a second wireless apparatus which receives the plurality of sensor data, and
   a controller which controls the second wireless apparatus to transmit information for the wireless terminal to the wireless terminal,
   wherein the first wireless apparatus is transformed from the second operating state into the second suspended state after receiving the information for the wireless terminal, and
   the first wireless apparatus repeats the second operating state and the second suspended state.

10. The network system according to claim 9, wherein the first wireless apparatus transmits the plurality of sensor data to the base station so as not to overlap with measurement of the sensor in the plurality of the first operating state.

11. The network system according to claim 9, wherein the sensor is transformed from the first suspended state into the first operating state based on a value or an amount of change in a physical quantity measured by the wireless terminal.

12. The network system according to claim 9, wherein the wireless terminal or the base station estimates a result of the measurement with the sensor, and the wireless terminal does not transmit the measured data when the result of the measurement with the sensor is matched with the estimated result.

* * * * *